Dec. 9, 1924.
W. F. HENDERSON
STUFFER HORN
Filed May 19, 1924
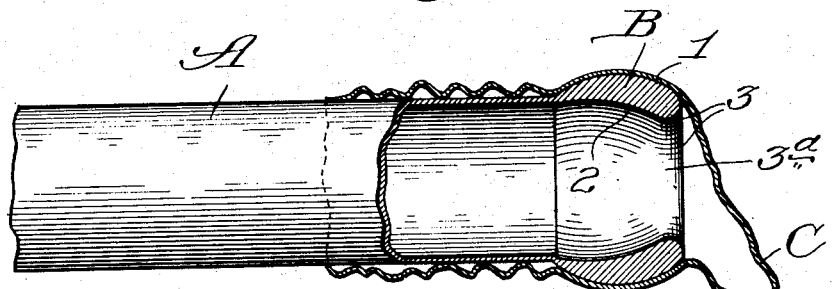
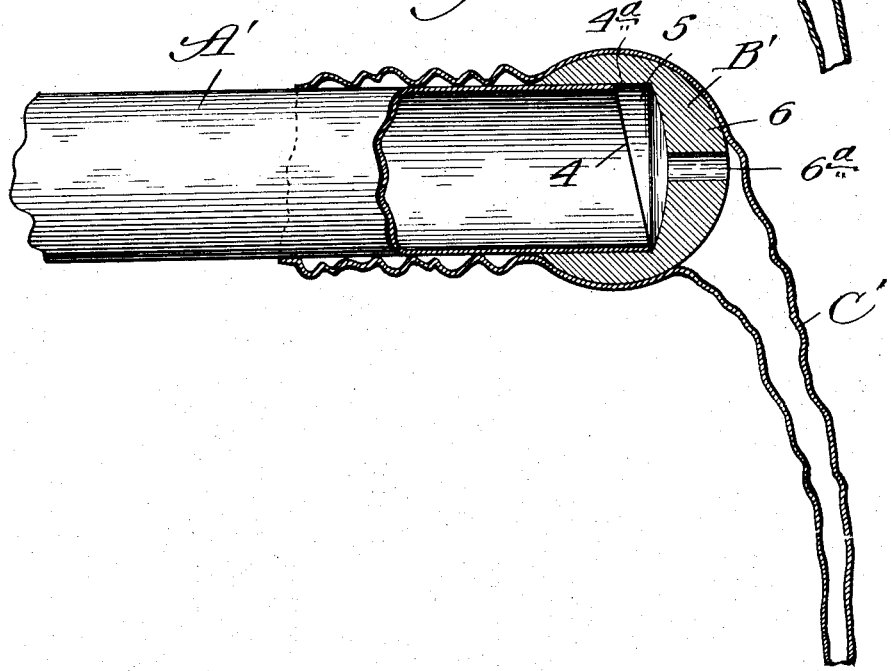
Inventor:
William F. Henderson Patented Dec. 9, 1924.

1,518,511

UNITED STATES PATENT OFFICE.

WILLIAM FRANKLIN HENDERSON, OF PITTSBURGH, PENNSYLVANIA, ASSIGNOR TO ERWIN O. FREUND, OF CHICAGO, ILLINOIS.

STUFFER HORN.

Application filed May 19, 1924. Serial No. 714,304.

*To all whom it may concern:*

Be it known that I, WILLIAM F. HENDERSON, a citizen of the United States, residing at Pittsburgh, in the county of Allegheny and State of Pennsylvania, have invented a new and useful Improvement in Stuffer Horns, of which the following is a specification.

This invention relates particularly to stuffer-horns for sausage machines.

As it is well-known in the art, it is common, in stuffing a tube, or casing, in preparing sausages, wieners, and bolognas, to extrude the sausage from a suitable machine which is equipped with a tubular horn. Before beginning the extruding operation, the sausage-casing is gathered onto the horn, and is allowed to slip therefrom as the extruding operation proceeds.

Where an artificial casing is to be employed, there is great danger that the casing may be injured, particularly in the operation of gathering the casing upon the horn. The primary object of the present invention is to provide an improved horn which will enable a casing to be gathered thereon with facility, and without danger of injuring the casing. A further object is to enable the purpose just mentioned to be accomplished in such manner that the subsequent extruding operation will not be impeded, but rather will be facilitated.

The invention is illustrated in its preferred embodiment in the accompanying drawing, in which—

Figure 1 represents brokenly, and partly in section, a stuffer-horn, constructed in accordance with the invention, the view illustrating the manner in which a sausage-casing is slipped onto, or gathered, upon the horn; and Fig. 2 represents a similar view, illustrating a modification of the invention.

Referring to Fig. 1, A represents a tubular horn equipped with an annular tip B; and C represents the sausage-casing.

The tubular member A may be formed by rolling a light strip of sheet metal into tubular form and soldering the meeting edges; or the tube may constitute a seamless tube. The annular tip B may be formed integrally with the tube A, in any suitable manner, or the tip may be separately formed, by suitable turning operation, and may then be welded or soldered to the extremity of the tube A. In either case, the tip is virtually formed integrally with the tube, in the sense that it constitutes a rigid and permanent extension of the tube. The exterior surface 1 of the tip preferably constitutes a portion of a sphere having a somewhat larger diameter than the external diameter of the tube A. The tip has a relatively thick wall, whose inner surface is indicated at 2. Both the inner and outer surfaces converge somewhat to the free extremity of the tip and coalesce with the rounded annular surface 3 which forms an annular lip encircling the somewhat contracted orifice $3^a$ of the tip.

In practice, the external diameter of the tip of the horn is slightly less than the diameter of the sausage-casing; and when the casing is applied to the horn, it is gathered on the horn in a well understood manner. The sausage is extruded from the sausage machine through the horn in a well-known manner. Usually the sausage machine is equipped with a screw conveyor which operates to gradually extrude the sausage. As the extruding operation proceeds, the operator regulates the manner in which the sausage-casing slips from the horn; and, in this manner, the proper filling of the casing is regulated.

In applying the sausage-casing to the horn, the casing naturally tends to drop downwardly from the extremity of the horn. By employing the part-spherical surface at the tip, the free end portion of the tip presents a rounded taper which serves to gradually open the casing. Moreover, this surface operates to so open the casing that it will not tend to catch on the edge presented by the extremity of the tip. Again, the annular extremity of the tip is so rounded that in case the upper wall of the sausage-casing should come in contact therewith, there is no danger of the casing catching and tearing. The tip presents an external surface which is rounded in every direction; and the slight prominence of the tip facilitates the drawing of the sausage-casing thereover and shirring or gathering the casing on the tube in the rear of said prominence. In the extruding operation, the operator is able to easily regulate the withdrawal of the sausage-casing by applying slight pressure upon the casing just back of the largest diameter.

In the modification shown in Fig. 2, A' represents a sausage machine horn, such as is ordinarily employed in the art; and B' represents a removable tip applied thereto. Usually the extremity of the horn is cut on an incline, as indicated at 4. The tip B' may constitute a portion of a metal ball having the metal cut away at one side and a bore 5 formed in the metal, thus affording a socket into which the extremity of the tube A' fits. The end wall 6 is provided with a perforation 6ª. When the tip is applied to the tube, the air may escape through the passage 6ª; and if there be any of the meat projecting, it may extrude through said perforation. The casing C' may be slipped onto the horn after the tip B' has been applied to the horn. Obviously, the tip B' affords a rounded taper extremity which serves to open up the casing as it is applied to the horn. The tip prevents possibility of the casing catching upon the corner 4ª of the tube.

In employing the construction shown in Fig. 2, the tip is removed after the casing has been gathered on the horn and before the extruding operation begins.

The improved device is especially desirable for use in connection with sausage machines employed for stuffing edible artificial sausage-casings, as, for example, sausage-casings made from especially prepared cellulose hydrate. Such artificial casings may now be made with extremely thin walls; and while such casing possesses all the strength and tenacity requisite for its purpose, the artificial product will not slip readily onto a sausage-machine horn. The improved device enables the artificial casing to be applied to the horn with great facility, however; and, as indicated above, in the preferred form of invention illustrated in Fig. 1, the improved device also facilitates the stuffing operation.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A stuffer-horn comprising a tube and a tip having an enlarged external diameter and presenting a rounded taper end surface.

2. A stuffer-horn comprising a tube and a thickened tip presenting a rounded annular end surface.

3. A stuffer-horn comprising a tube and an annular tip integral therewith having relatively thick walls terminating in a rounded annular lip.

4. A stuffer-horn comprising a tube and an annular tip having a part-spherical external surface and having an internal surface tapering toward the extremity of the tip and joined to said external surface by a rounded annular end surface.

5. A stuffer-horn comprising a tube and a removable part-spherical tip having a socket fitted on the end of said tube.

WILLIAM FRANKLIN HENDERSON.